(12) United States Patent
Murphy

(10) Patent No.: US 12,256,748 B2
(45) Date of Patent: Mar. 25, 2025

(54) FISH PROCESSING SYSTEMS AND METHODS

(71) Applicant: Ryco Equipment, Inc., Mountlake Terrace, WA (US)

(72) Inventor: Erik Murphy, Mountlake Terrace, WA (US)

(73) Assignee: Ryco Equipment, Inc., Mountlake Terrace, WA (US)

( * ) Notice: Subject to any disclaimer, the term of this patent is extended or adjusted under 35 U.S.C. 154(b) by 0 days.

(21) Appl. No.: 18/511,601

(22) Filed: Nov. 16, 2023

(65) Prior Publication Data

US 2024/0164392 A1 May 23, 2024

Related U.S. Application Data

(60) Provisional application No. 63/384,209, filed on Nov. 17, 2022.

(51) Int. Cl.
*A22C 25/08* (2006.01)
*A22C 25/14* (2006.01)

(52) U.S. Cl.
CPC ............ *A22C 25/142* (2013.01); *A22C 25/08* (2013.01)

(58) Field of Classification Search
CPC ........ A22C 25/142; A22C 25/08; A22C 25/18
USPC ........................................................ 452/198
See application file for complete search history.

(56) References Cited

U.S. PATENT DOCUMENTS

| | | | |
|---|---|---|---|
| 2,584,567 A | 2/1952 | Fonken et al. | |
| 4,170,806 A * | 10/1979 | Pettersson | A22C 25/08 452/154 |
| 5,937,080 A * | 8/1999 | Vogeley, Jr. | B26D 7/30 382/110 |
| 6,361,426 B1 * | 3/2002 | Kragh | A22C 25/08 452/157 |
| 2013/0189913 A1 * | 7/2013 | Ryan | A22C 25/142 452/149 |

FOREIGN PATENT DOCUMENTS

| CN | 111713544 A | 9/2020 |
|---|---|---|
| JP | 5526871 A | 2/1980 |

* cited by examiner

*Primary Examiner* — Richard T Price, Jr.
(74) *Attorney, Agent, or Firm* — Seed IP Law Group LLP

(57) ABSTRACT

A fish processing system includes a measurement sensor configured to measure a distance across a head of a fish as the fish moves along a conveyor. A drive mechanism provides movement of a blade across a transport path of the fish along the conveyor in response to the determined distance to accurately sever the head of the fish based on the size of the fish. The system may also include a detection sensor for closing a wall of a trough to reject fish with heads that are not properly removed by the blade as well as an adjustment cylinder to vary a position of a conveyor relative to a fish processing subsystem to avoid jamming. Related methods for severing a portion of each fish in a series of transported fish based on the size of each fish are also provided.

22 Claims, 13 Drawing Sheets

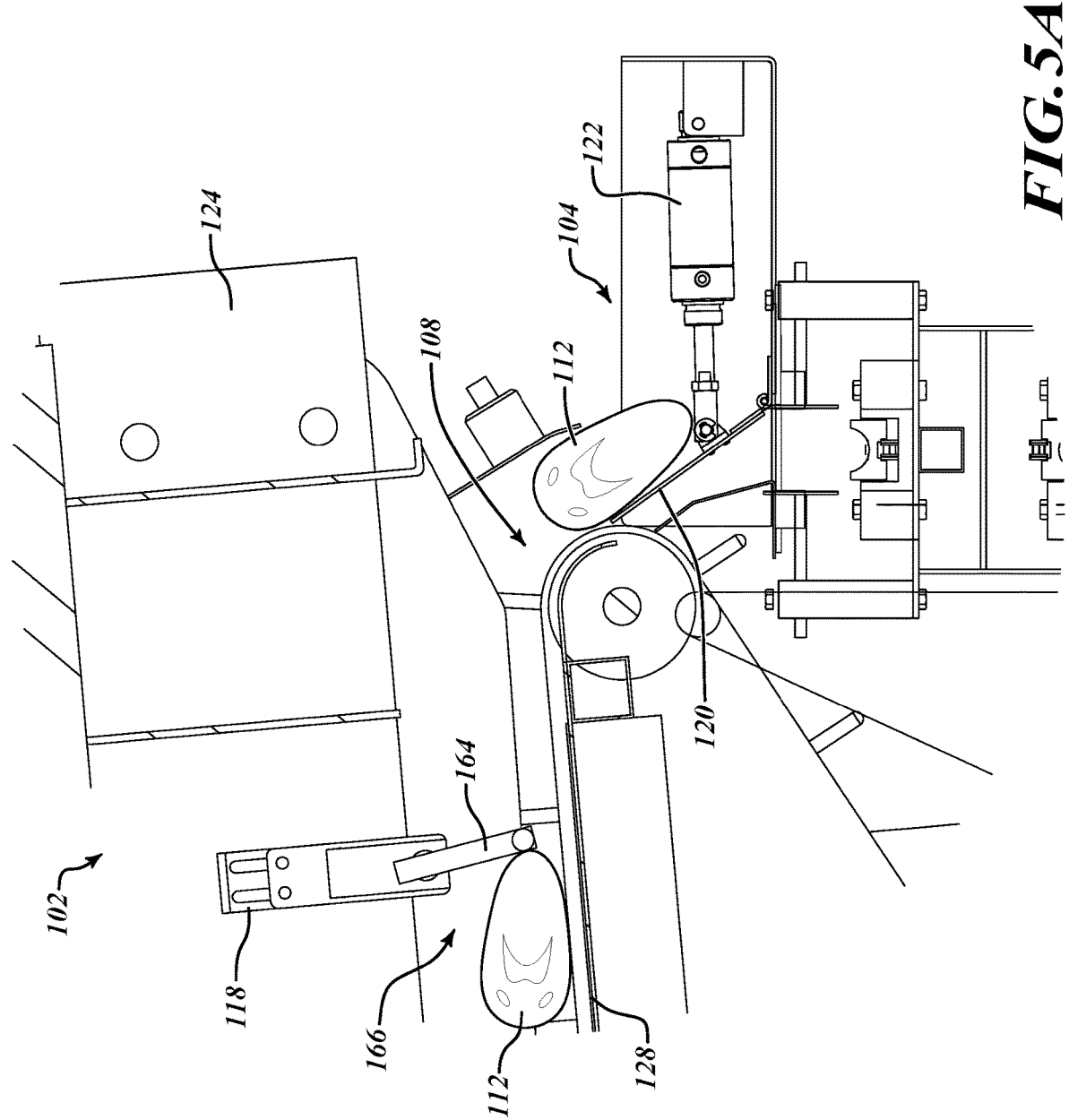

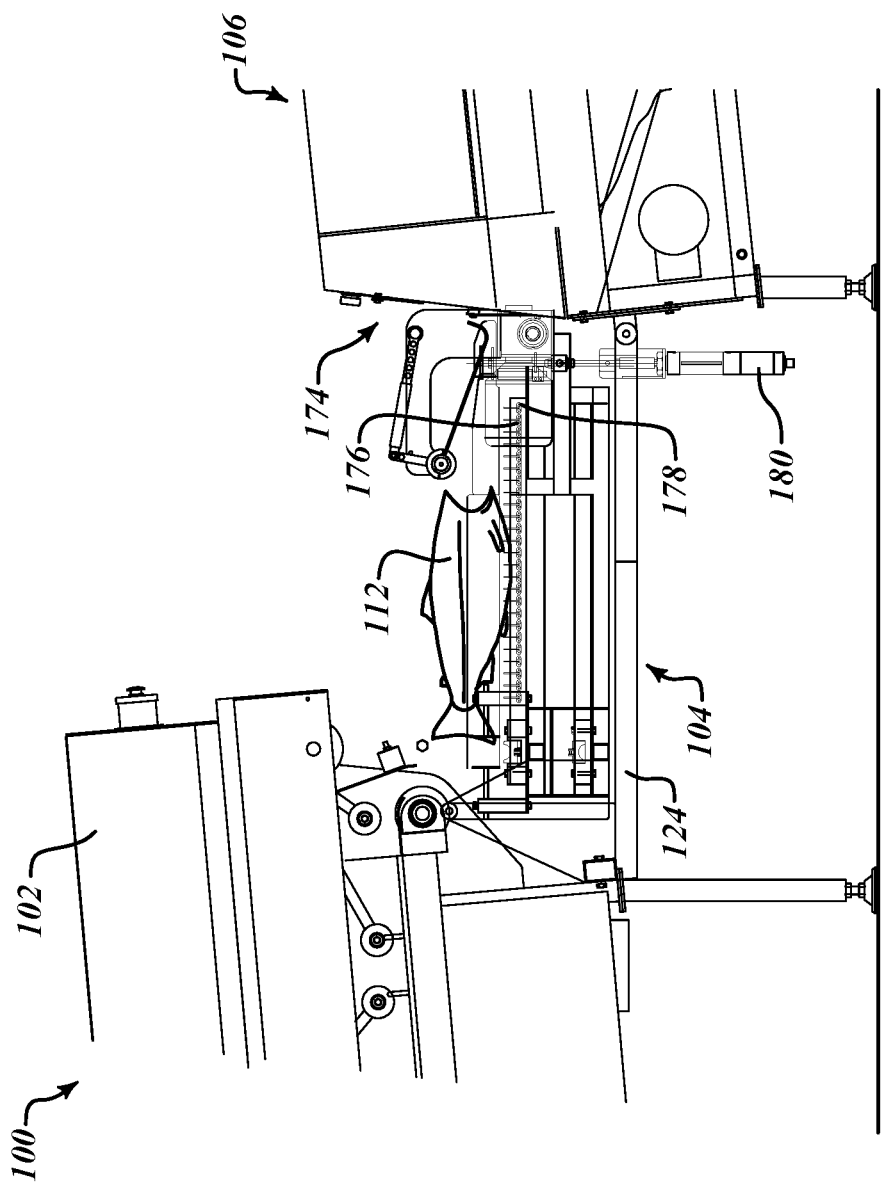

FISH PROCESSING SYSTEMS AND METHODS

CROSS-REFERENCE TO RELATED APPLICATION(S)

This application claims the benefit of U.S. Provisional Patent Application No. 63/384,209 filed Nov. 17, 2022, all of which is incorporated herein by reference in its entirety.

BACKGROUND

Technical Field

This disclosure generally relates to systems and methods for processing fish, and more particularly to systems and methods for severing the head of a fish from its body and positioning the fish in alignment with a gutting machine in a reliable and consistent manner.

Description of the Related Art

In some fish products, the head is removed at the gills, leaving a hard cartilage structure on the head end of the fish called the collar. The viscera, including the gonads (roe or milt) are removed, the kidney membrane is cut and the kidney is removed with water sprays and brushes. In the salmon industry, this product is called a head and gut product and is a valuable commodity. An initial step of preparing such head and gut product is the removal or severing of the head from the body of the fish. Various devices for severing the head of the fish are known, including systems which feature a guillotine knife operated with a pneumatic cylinder which is actuated with compressed air to plunge through fish transported beneath the knife.

While known systems have been generally effective in fish head removal, the systems may suffer from various deficiencies and shortcomings, such as, for example, inadvertent damage to the fish resulting from mistiming of guillotine knife devices, and the systems being complex and expensive to produce and operate. In addition, known systems are not particularly suited for processing fish of different sizes, which can lead to jamming in the processing machinery and an overall reduction in the efficiency of the operation. Thus, it would be advantageous to have a fish processing system and method that overcomes the shortcomings of the prior art.

BRIEF SUMMARY

The systems and methods of processing fish described herein provide for the efficient removal of fish heads in a particularly reliable and robust form factor and include cutting and alignment systems and methods for processing fish of different sizes.

For example, the systems and methods described herein may include a system with a blade that is decoupled from movement of a conveyor belt transporting the fish and a measurement sensor, which may be a laser measurement sensor, that measures a height of the fish across the head from the belly to the back of the fish to generate an approximate of a size of each fish. The blade then performs the cut with irregular timing at a selected location along each fish in accordance with the determined size of each fish to increase cut accuracy and reduce the likelihood of jamming.

The systems and methods may also include a trough with a detection sensor that is configured to detect whether a head of the fish was successfully removed by the blade. If not, the detection sensor activates an actuator mechanically coupled to a moveable sidewall of the trough to a closed position to prevent the fish from entering the trough. Further, the systems and devices may include an adjustment cylinder associated with a conveyor for adjusting a position of the fish relative to a fish processing subsystem to align the fish with an inlet of the fish processing subsystem. As a result, the concepts of the disclosure enable more precise fish processing methods that reduce the likelihood of jamming, among other benefits.

The above examples are non-limiting and additional features and advantages will be described in greater detail herein.

BRIEF DESCRIPTION OF THE SEVERAL VIEWS OF THE DRAWINGS

FIG. 5A is a side elevational view of a detection sensor triggering an actuator associated with the trough of FIG. 1B to manipulate the trough to a closed position.

FIG. 6A is a side elevational view of the trough and a gutting subsystem of the fish processing system of FIG. 1A with an adjustment cylinder for changing a position of a portion of the trough relative to the gutting subsystem.

DETAILED DESCRIPTION

The systems and methods of processing fish described herein provide for the efficient removal of fish heads in a particularly reliable and robust form factor and include cutting and alignment systems and methods for processing fish of different sizes, among other features and advantages. Although the present disclosure will describe embodiments for fish processing, it is to be appreciated that the concepts of the disclosure are applicable in various other industries and processes, such as at least with respect to any process that involves removing or severing a portion of an object, and particularly, but not exclusively, removing a portion of a food product. Accordingly, the disclosure is not limited solely to fish processing.

Figure 1A:
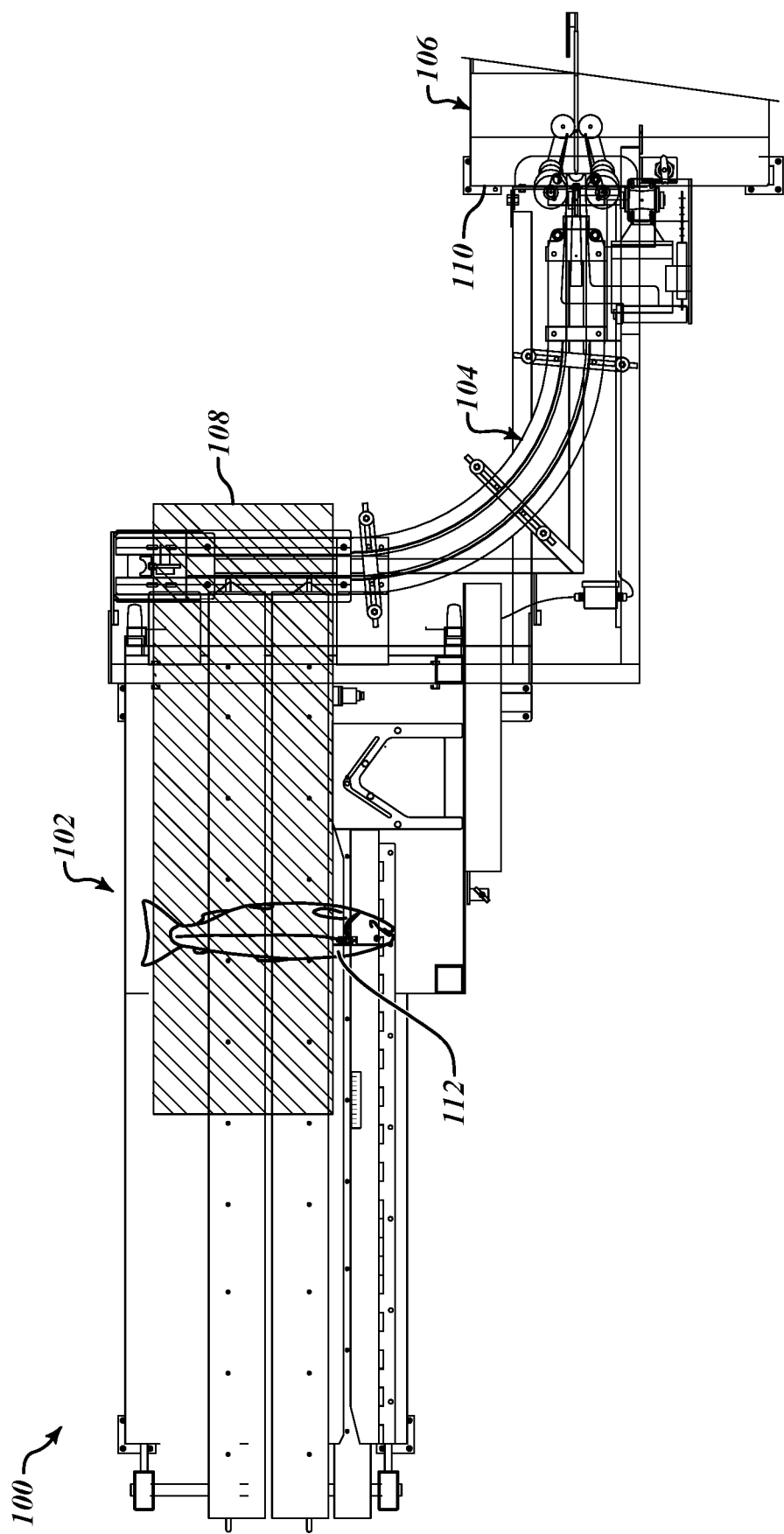
FIG. 1A is a top plan view of an embodiment of a fish processing system according to the present disclosure.

Beginning with FIG. 1A, illustrated therein is a fish processing system 100 that includes a cutting subsystem 102, a trough 104, and a gutting subsystem 106. Each of the cutting subsystem 102, trough 104, and gutting subsystem 106 may also be referred to herein as a fish processing subsystem or more generally as a subsystem. The trough 104 is in communication with an outlet 108 of the cutting subsystem 102 and an inlet 110 of the gutting subsystem 106. Fish 112 are conveyed along a transport path through the fish processing system 100 that begins with the cutting subsystem 102. The cutting subsystem 102 removes a head of the fish 112 and the de-headed fish are provided to the trough 104. Then, the trough 104 conveys the de-headed fish 112 to the gutting subsystem 106 for further processing, such as to remove internal matter in the de-headed fish 112.

Figure 1B:
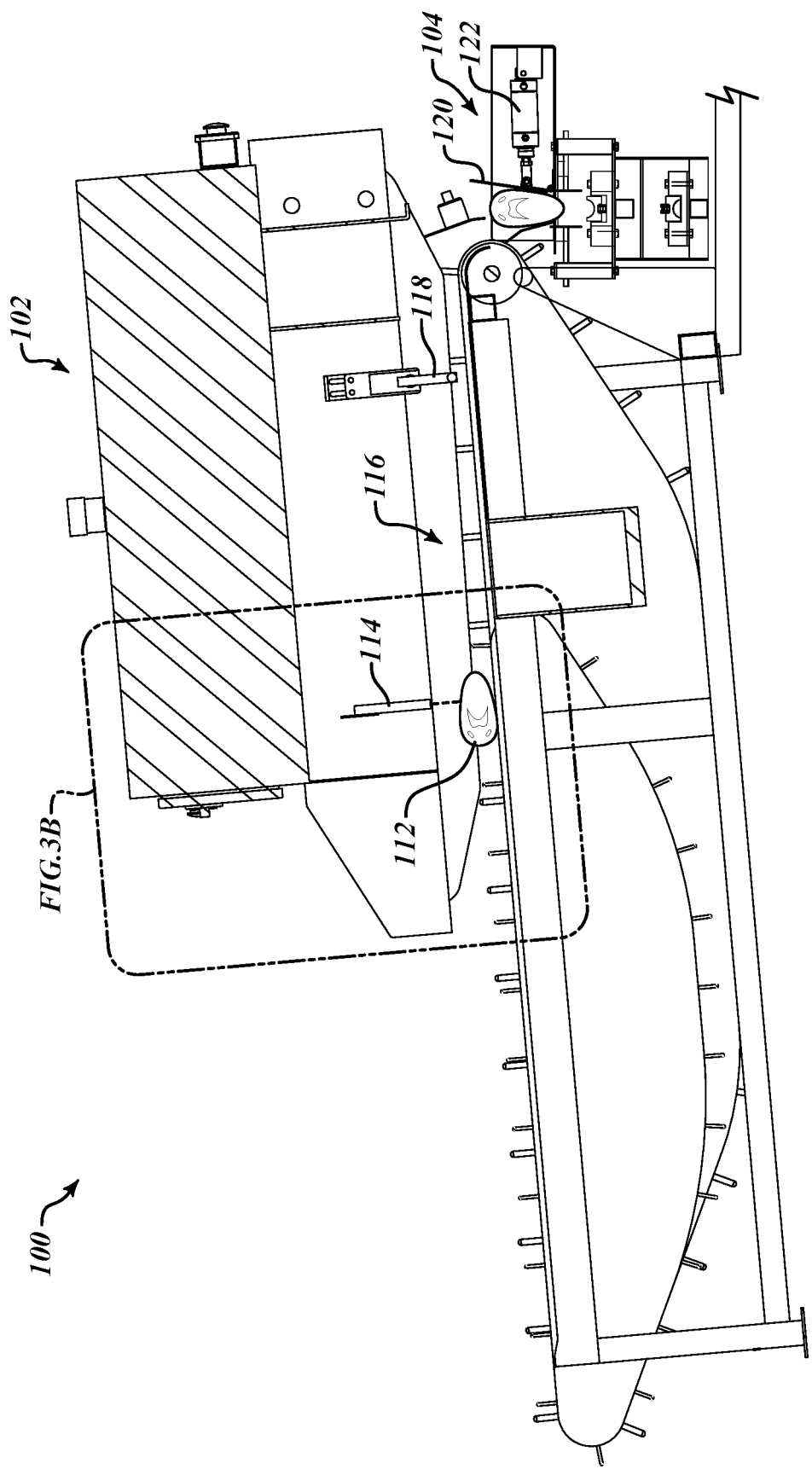
FIG. 1B is a side elevational view of a cutting subsystem and a trough of the fish processing system of FIG. 1A.

FIG. 1B is a side elevational view of the cutting subsystem 102 and the trough 104 of the fish processing system 100. As will be explained in greater detail below, the cutting subsystem 102 includes a first sensor 114 that may be a distance sensor or a measurement sensor upstream of a cutting location 116 where the head of the fish 112 is removed. Accordingly, the first sensor 114 may also be referred to herein as a distance sensor 114 or a measurement sensor 114. The cutting subsystem 102 also includes a second sensor 118 that may be a detection sensor or a contact sensor configured to determine whether the head of the fish 112 remains on the fish 112 after the cutting operation. Accordingly, the second sensor 118 may also be referred to herein as a detection sensor 118 or a contact sensor 118. The trough 104 includes a moveable sidewall 120 that is coupled to an actuator 122 configured to move the sidewall 120 between an open and closed position in response to the determination of whether the head remains on the fish 112 via the second or detection sensor 118.

Figure 2:
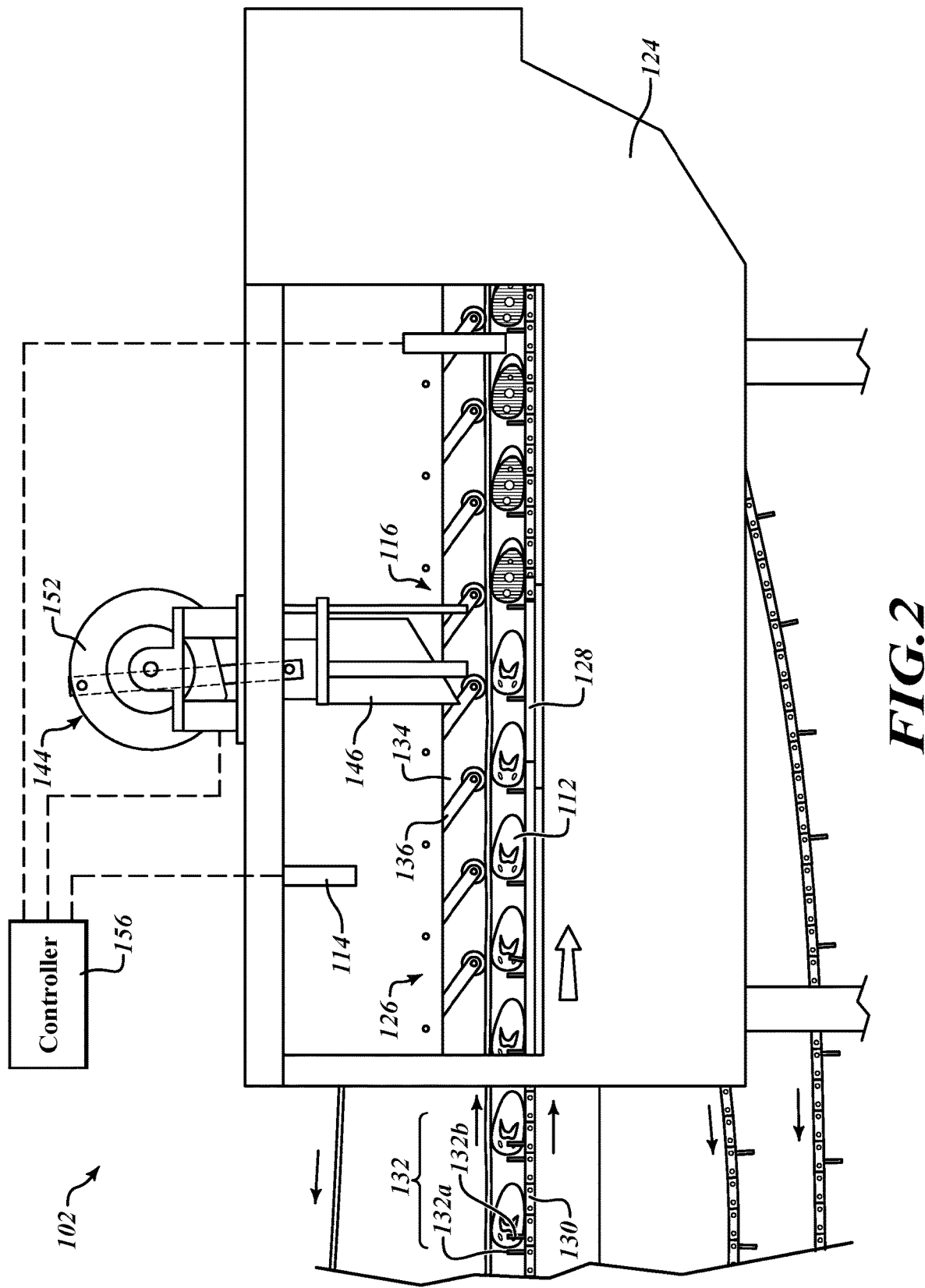
FIG. 2 is a schematic side elevational of the cutting subsystem of FIG. 1B.

FIG. 2 is a schematic diagram of the cutting subsystem 102. The cutting subsystem 102 includes a structural frame 124 to support various conveying and processing elements in a relatively compact form factor. The frame 124 supports at least a portion of a conveyor system 126 which is configured to convey fish 112 received on a conveyor device 128 thereof across a cutting location 116 during operation. The conveyor device 128 may include, for example, belts, chains, or movable beds as well as associated drive mechanisms, gears, wheels, sprockets, and the like for transporting the fish 112 across the cutting location 116. In the embodiment shown in FIG. 2, for example, the conveyor device 128 includes roller chains 130 routed over a plurality of corresponding sprockets (not shown) which are arranged to carry fish 112 in a feed direction through the cutting subsystem 102 (i.e., from left to right in the orientation of FIG. 2). Locating features 132 such as, for example, upstanding pegs or other protrusions are coupled to the roller chains for positioning the fish 112 at regular intervals and in consistent positions for subsequent processing operations.

For example, first locating features 132a may be coupled to a primary roller chain and are spaced to engage a first portion of each fish 112, such as, for example, the top of each fish 112. Second locating features 132b are coupled to a secondary roller chain and spaced to engage a second portion of each fish 112, such as, for example, a head of each fish 112. The secondary roller chain and corresponding locating features 132b may be configured to disengage the fish 112 prior to or upon reaching the cutting location 116 so as not to interfere with a cutting operation of the head of the fish 112 described herein. Collectively, the roller chains 130 and locating features 132 may locate the fish 112 at generally regular and consistent intervals to be cut in a repeatable manner as the roller chains 130 transport the fish 112 toward the cutting location 116. In an embodiment, the fish 112 may be arranged on the roller chains 130 and locating features 132 at irregular intervals, including irregular intervals that arise as a result of differences in the sizes of the fish to be processed.

The conveyor system 126 may further include a supplemental belt 134 and tension devices 136 to assist in transporting fish 112 across the cutting location 116. More particularly, the supplemental belt 134 may be provided to move in unison with the primary roller chain with tension devices 136 biasing the supplemental belt 134 and fish 112 in a downward direction. This arrangement may ensure that the fish 112 remain firmly positioned for subsequent processing activities.

The cutting subsystem 102 may further include a drive device 144 that may be, for example, an electric rotary drive motor. In an embodiment, the drive device 144 may instead be a pneumatic cylinder, linear actuator, or hydraulic drive device, among other possibilities. The disclosure also contemplates one or more such drive devices operating in combination. The drive device 144 is structured to intermittingly move a blade 146 between a standby position shown in FIG. 2, and a cutting position where the blade 146 is driven vertically downward and through the head of the fish 112 (i.e., the blade 146 extends beyond the head of the fish 112 in the cutting position) to sequentially sever a head or other portion from each of the fish 112 conveyed across the cutting location 116.

In a non-limiting example where the drive device 144 is a motor, the drive device 144 may include a drive wheel 152. In an embodiment, at least the drive device 144 is in electronic communication with a controller 156 that provides instructions to activate the drive device 144 to perform the cutting operation at irregular intervals corresponding to a determined size of each fish 112. For example, the controller 156 may communicate with measurement sensor 114 to determine the size of an individual fish 112 as the fish 112 moves towards the cutting location 16. Then, after a distance across the fish 112 is measured by the measurement sensor 114 and a cut location on the fish 112 and timing of the cut are determined, the controller 156 may send instructions, signals, and/or data to the drive device 144 to intermittently set the drive wheel 152 into rotary motion to plunge the blade 146 toward the cutting position 116 to sever the head or other portion from the fish 112 at irregular intervals based on the determined size of the fish 112. The drive wheel 152 may also continue to rotate to retract the blade 146 back toward the standby position based on such instructions, signals, and/or data. Once the blade 146 returns to the standby position, the controller 156 inactivates the drive device 144 to again hold the blade 146 stationary while controller 156 determines, via the measurement sensor 114, a size of the next successive fish 112 approaching the cutting location 116. The cutting operation is then repeated at irregular intervals based on the determined size of each fish 112. The above operations may be similar with a different type of drive device 144, although other drive devices 144 may omit the wheel 152 in some embodiments. As a result, the cutting subsystem 102 performs cuts at irregular intervals corresponding to a detected or measured size of each fish 112, as further described below.

Figure 3A:
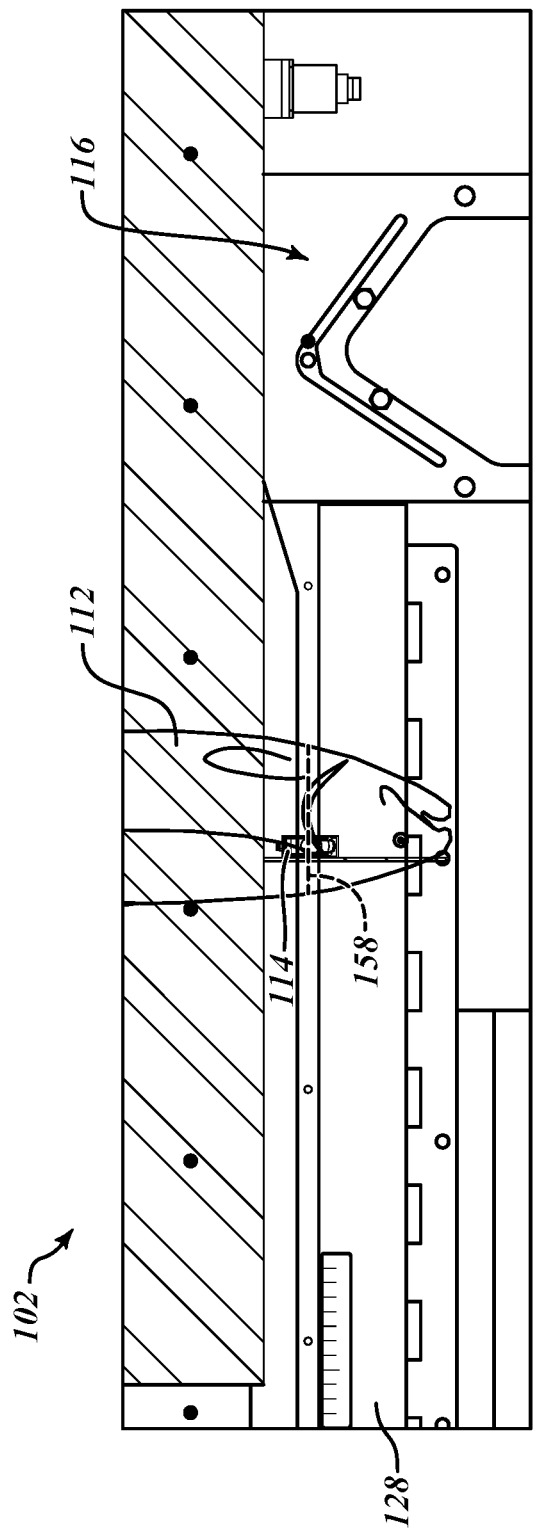
FIG. 3A is a schematic plan view of a measurement sensor of the cutting subsystem of FIG. 1B.
Figure 3B:
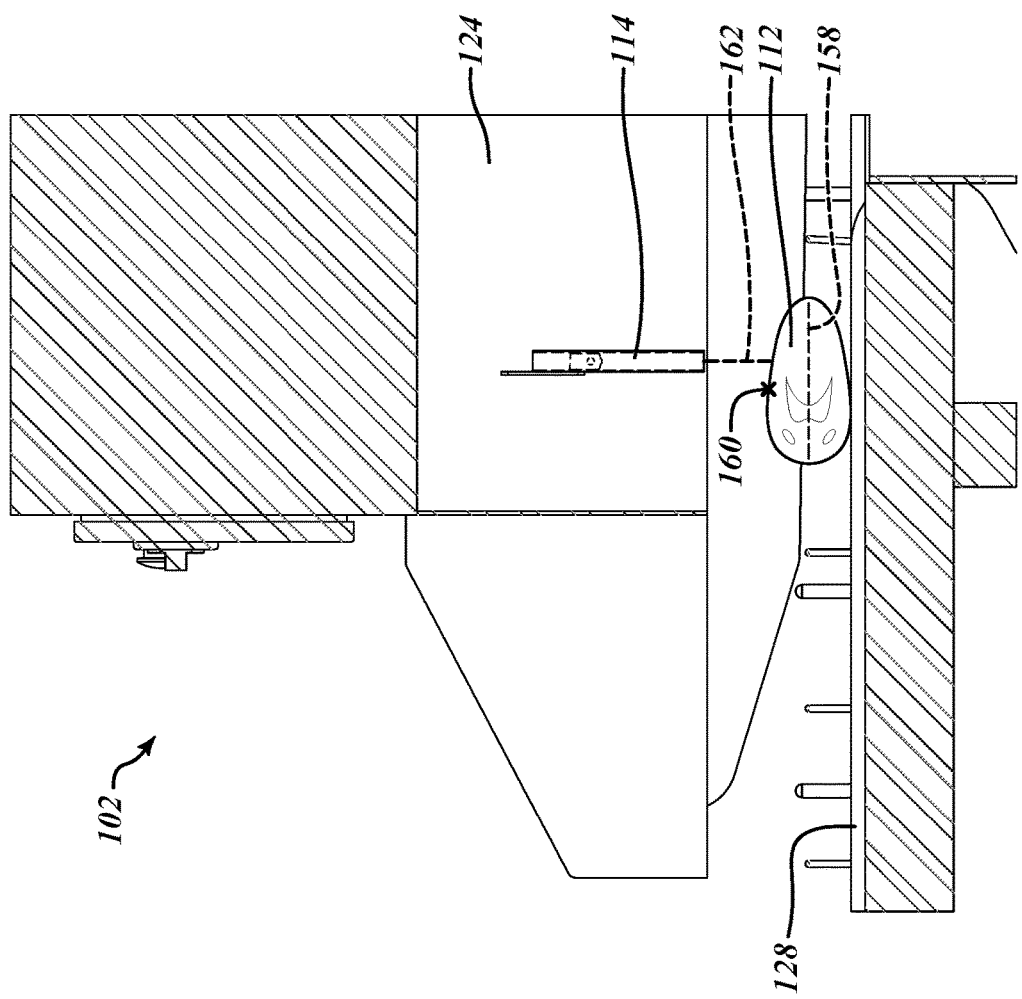
FIG. 3B is a schematic elevational view of the measurement sensor of the cutting subsystem of FIG. 1B.

FIG. 3A is a schematic plan view of the measurement sensor 114 of the cutting subsystem 102 and FIG. 3B is a schematic elevational view of the measurement sensor 114 of the cutting subsystem 102. With reference to FIG. 3A and FIG. 3B, the measurement sensor 114 may be located upstream of the cutting location 116 relative to a movement direction of the conveyor device 128 and/or transport path through the cutting subsystem 102. The measurement sensor 114 is operable to measure a dimension 158 across each fish 112, which may be a horizontal distance across the fish 112 or a height of the fish 112 across the head from a belly to a back of the fish 112. The dimension 158 of the fish 112 across the head can then be used to generate an approximate size of each fish based on a correlation table or other information and/or data stored in the controller 156. Such correlation table may include values or ranges of values corresponding to the dimension 158 as well as approximate fish characteristics, such as size, length, weight, or others, that correspond to a given value or range of values for the dimension 158 (i.e., where the dimension 158 is 5 inches, the fish is 28 inches long, weighs between 5-10 pounds, etc.).

The measurement sensor 114 may be a laser measuring device that measures the dimension 158 across the fish 112 as the fish 112 is moved along the transport path by the conveyor device 128. In an embodiment, the measurement sensor 114 is a proximity sensor that detects whether a fish 112 is present on the conveyor device 128 in a field of view of the sensor 114 over a certain period of time. For a given rate of movement of the conveyor device 128 in such an embodiment, the amount of time that the fish 112 is within the field of view of the measurement sensor 114 can be utilized to determine the dimension 158, such as at least via the controller 156. For example, if the conveyor device 128 is operable to move the fish 112 at a rate of one foot per second, and the proximity sensor 114 determines that the fish 112 is present for 0.5 seconds, then the dimension 158 is 6 inches. Other variations and configurations are possible.

In some embodiments, and as best shown in FIG. 3B, the dimension 158 and/or the determined size of the fish 112 is also used to determine a sever or cut location 160 on each fish 112. The sever location 160 can be selected and may depend, at least in part, on the size and configuration of the blade 146 of the cutting subsystem 102 (FIG. 2), among other factors. Further, the sever location 160 is preferably in the body of the fish 112 behind the gills or the gill plate (i.e., toward the tail of the fish 112 from the gills or the gill plate). In some embodiments, the fish 112 are arranged on the conveyor device 128 in a manner that approximately aligns the sever location 160 on the fish 112 with the cutting location 116 of the blade 146. In such embodiments, the sever location 160 may correspond to a timing of the cut with the blade 146 (FIG. 2) such that a center of the blade 146 plunges through the sever location 160 to increase cut accuracy. The sever location 160 may preferably be located proximate to a center of the dimension 158, or at a location that is between 55% and 75% of the dimension 158 measured from the belly of the fish 112 (i.e., 5% to 25% beyond the center of the dimension 158 relative to the belly of the fish 112 or between 25% and 45% of the dimension 158 measured from the back of the fish 112) that generally corresponds to an area in the body of the fish 112 that is closer to a center of the gills than to the back of the fish 112. In an embodiment, the sever location 160 is approximately 30% (i.e., between 25% and 35%) of the dimension 158 measured from either the belly or the back of the fish 112. The determination of the sever location 160 may be performed by the controller 156 based on instructions, signals, and/or data from the measurement sensor 114, with the controller 156 also providing instructions to operate the blade 146 at intermittent intervals to sever each fish 112 at the sever location 160.

In an embodiment, and as shown in FIG. 3B, the measurement sensor 114 is coupled to the support frame 124 and is positioned above the fish 112 with a line of sight 162 directed downward and toward the fish 112 on the conveyor device 128. The location of the measurement sensor 114 may also be referred to as a measurement location in the system 100, with the measurement location generally being upstream from the cutting location 116, unless otherwise indicated. The measurement sensor 114 may also be positioned in other locations, such as least in a gap in the conveyor device 128 below the fish 112 or as part of a separate structure from the structural frame 124 in some embodiments. As such, the measurement sensor 114 may be operable to measure a horizontal distance across the fish 112 from a position vertically above the fish 112 in at least some embodiments.

In an embodiment, the fish 112 may have a different arrangement relative to the cutting location 116 and the dimension 158 may be measured at least partially across the gills of the fish 112. The gills or gill plate of the fish 112 may not be a desirable sever location because the gill plate and therefore the head may not be fully severed by the blade 116, among other challenges. In such an embodiment, the determined approximate size of the fish 112 can be used to determine the sever location 160 in the body of the fish 112. For example, if the determined length of the fish 112 is 28 inches and the gills of the fish 112 are aligned with the cutting location 116, the sever location 160 can be approximated to be 1 to 2 inches behind the gills, or another selected location, based on the determined size of the fish 112. The fish 112 may be adjusted to such a location manually or by conveyor device 128, and/or the position of the cutting location 116 of the blade 146 can be adjusted to align the sever location 160 with the cutting location 116 in some embodiments.

Figure 4A:
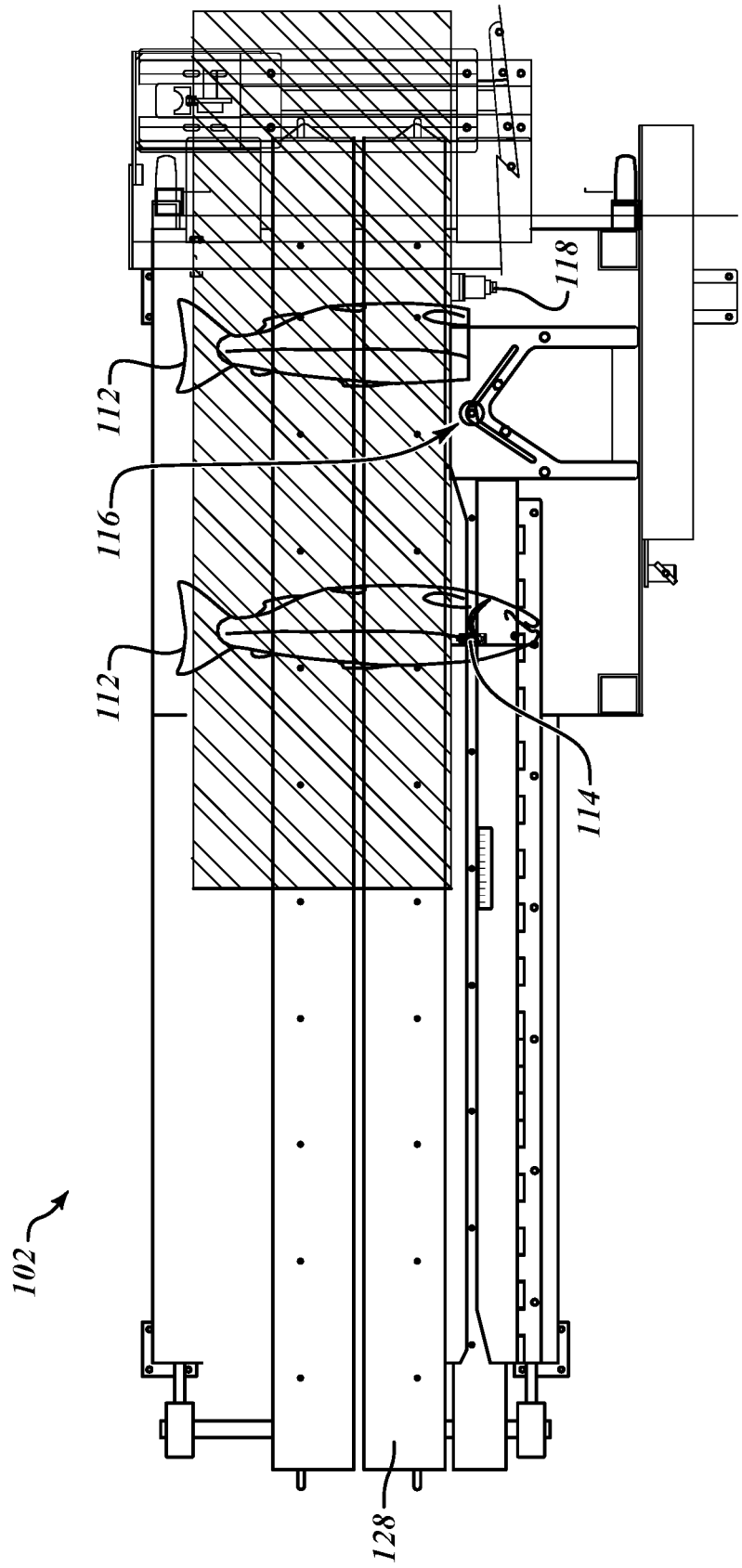
FIG. 4A is a schematic plan view of a measurement and cutting process of the cutting subsystem of FIG. 1B.
Figure 4B:
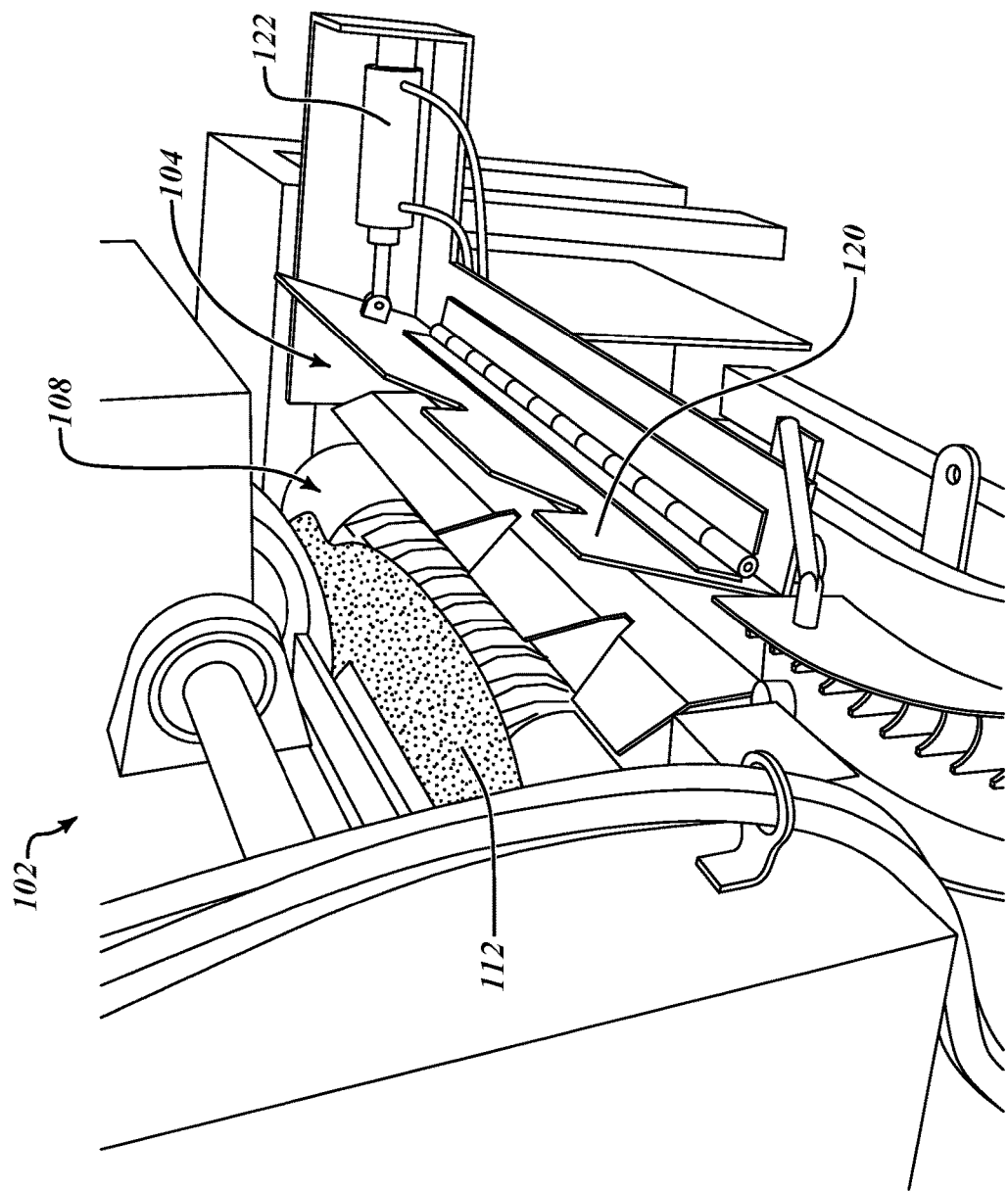
FIG. 4B is an isometric view of the trough of FIG. 1B in an open position.

FIG. 4A and FIG. 4B are schematic views of a successful cutting operation of the cutting subsystem 102 and subsequent operation of the second sensor 118 and the trough 104. In operation, and beginning with FIG. 4A, the conveyor device 128 moves fish 112 along the transport path through the cutting subsystem 102 (i.e., from left to right in the orientation of FIG. 4A). The first sensor 114 or measurement sensor 114 determines the size of each fish 112 and approximates the sever location 160 (FIG. 3B), as described above. The blade 146 (FIG. 2) is intermittently operated to cut each fish 112 at the sever location 160 (FIG. 3B) based on, or in accordance with, the readings from the measurement sensor 114. During the cutting operation, the head is removed from each fish 112, as shown in FIG. 4A. The severed heads may be collected for disposal, sale, or further processing.

Following the cutting operation, the conveyor device 128 conveys the severed fish 112 toward the second sensor 118 or detection sensor 118. Where the head is successfully removed according to the above process, the fish 112 does not contact, interface with, or otherwise trigger the detection sensor 118. As a result, and turning to FIG. 4B, the actuator 122 maintains a retracted position shown in FIG. 4B in which the movable sidewall 120 of the trough 104 is held in an open position below and aligned with the outlet 108 of the cutting subsystem 102 for receiving the severed fish 112. In other words, the trough 104 is maintained in the open position in response to a successful cutting operation of the type described above with reference to FIG. 4A in some embodiments. The severed fish 112 is received in the trough 104 and conveyed along the trough 104 for further processing, as described herein.

Figure 5B:
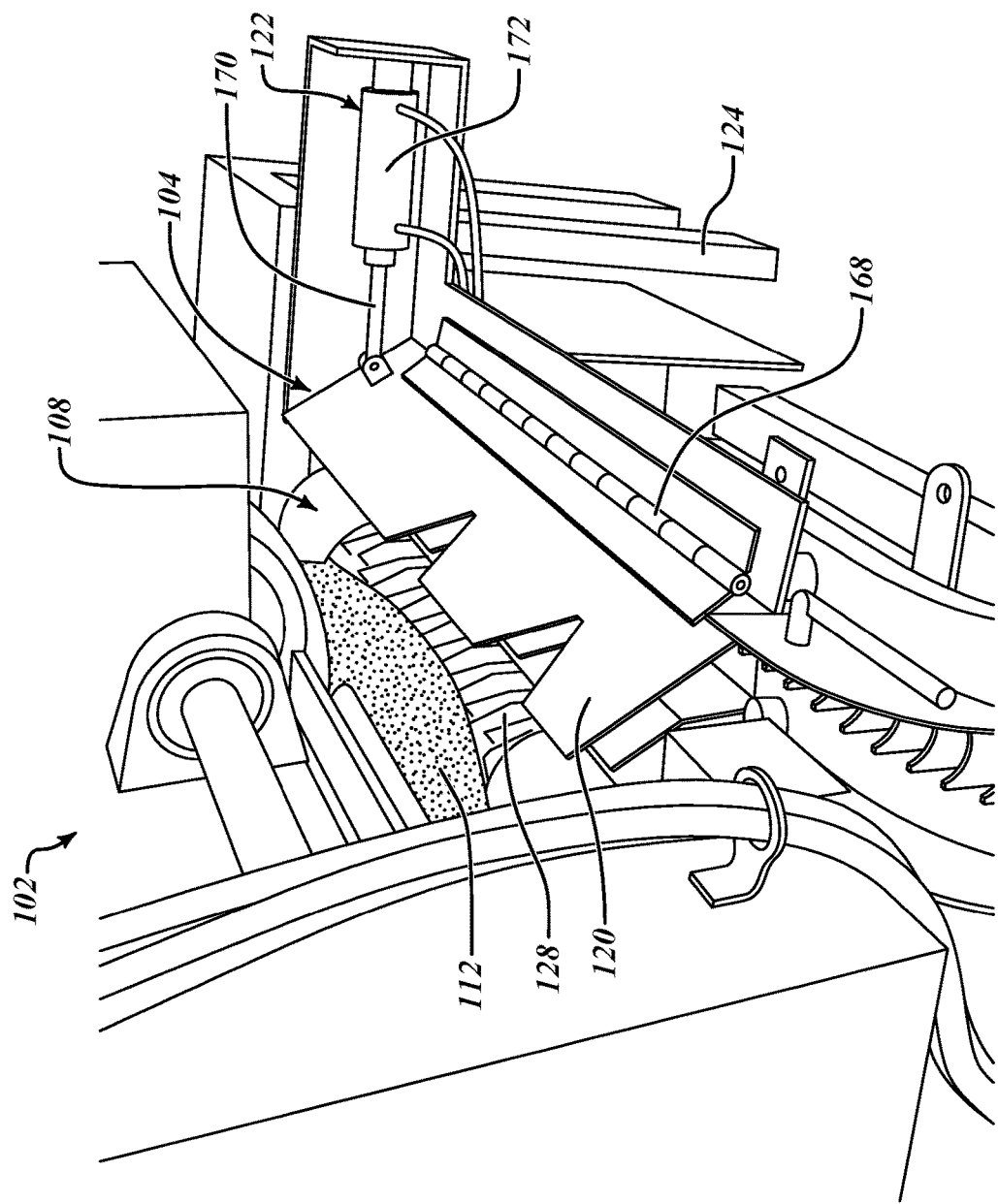
FIG. 5B is an isometric view of the trough of FIG. 5A in the closed position.

FIG. 5A and FIG. 5B illustrate operation of the system 100 in response to an unsuccessful cutting operation where at least a portion (i.e., the head or another portion of the head) of the fish 112 improperly remains on the body of the fish 112. Specifically, FIG. 5A is a side elevational view of the second sensor 118 or detection sensor 118 triggering the actuator 122 to manipulate the trough 104 to a closed position. FIG. 5B is an isometric view of the trough 104 in the closed position.

Beginning with FIG. 5A, the cutting operation described above may not always be successful in removing the entirety of a desired portion of the fish 112, such as the head (or some other portion) of the fish 112. Such improper cuts can occur because of errors in the alignment of the fish 112 with the cutting location 116 and errors with the operation of the blade 146 (FIG. 2) and the system for driving the blade, among other factors. If the head of the fish 112 is not completely removed, the intact fish 112 can jam the system 100, which increases downtime and reduces efficiency. Accordingly, if an improper cut occurs that fails to sever the entire head or other desired portion of the fish 112, the detection sensor 118 triggers the actuator 122 to manipulate the trough 104 to a closed position.

In more detail, the detection sensor 118 may be provided in the form of a contact sensor with an arm 164 that is adjacent to, but spaced from, the conveyor device 128. When a fish 112 that improperly includes the head is conveyed along the transport path by the conveyor device 128, the head of the fish 112 contacts the detection sensor 118 and causes the arm 164 to rotate or otherwise move away from the conveyor device 128. Such movement of the arm 164 beyond a threshold value (which may be an amount of rotation, such at least 5 degrees, or a distance, such as at least 0.25 inches) triggers the sensor 118 to send instructions, signals, and/or data to the controller 156 (FIG. 2) to activate the actuator 122 and push the movable sidewall 120 toward the outlet 108 of the cutting subsystem 102. Such movement of the moveable sidewall 120 closes the trough 104 and prevents fish at the outlet 108 of the cutting subsystem 102 from entering the trough 104. Rather, the rejected fish 112 slide down an outer face of the movable sidewall 120 to be collected for additional processing. In an embodiment, the detection sensor 118 is coupled to the structural frame 124 and operable to detect whether the portion (such as the head or some other portion) has been properly removed from the fish 112 at a detection location 166 downstream of the cutting location 116 (FIG. 4A) relative to the path of travel of the conveyor device 128. The detection location 166 is located between the cutting location 116 and the outlet 108 of the cutting subsystem 102 in a particularly advantageous embodiment, although other configurations are contemplated herein, such as the detection sensor 118 being located at the outlet 108, or at any entry to the trough 104. In further embodiments, the detection sensor 118 may be a proximity sensor of the type described above, a time of flight sensor, or some other type of sensor, instead of a contact sensor.

FIG. 5B provides additional detail of the trough 104 in the closed position. The moveable sidewall 120 may be coupled to the structural frame 124 or some other aspect of the trough 104 with a hinge 168, which may be a piano hinge or some other type of hinge in some embodiments. Further, the actuator 122 may be a linear actuator that is electrically or hydraulically driven, among other possibilities. The actuator 122 has a rod 170 that is coupled the moveable sidewall 120 and operable to slide into and out of a housing 172 of the actuator 122. The drive components of the actuator 122 for moving the rod 170 may likewise be accommodated in the housing 172. The actuator 122 is in communication with the controller 156 (FIG. 2) such that the actuator 122 can receive instructions, signals, and/or data from the controller 156 to move the rod 170 into and out of the housing 172 in response to the operation of the detection sensor 118 above. In FIG. 5B, the actuator 122 is in an extended position corresponding to the closed position of the trough 104 in which the rod 170 is extend from the housing 172 to rotate the sidewall 120 toward the outlet 108 of the cutting subsystem 102 about the hinge 168 and close the trough 104. In the context of FIG. 5A and FIG. 5B, the trough 104 being "closed" refers to the sidewall 120 being in a position where a suitable fish 112 for processing in the system 100 is not able to enter the trough 104. As a result, "closed" may mean that the sidewall 120 is adjacent to, in contact with, or positioned in close proximity to the conveyor device 128 at the outlet 108 of the cutting subsystem 102, or the sidewall 120 may be spaced from the conveyor device 128 at the outlet 108 of the cutting subsystem 102 by less than 1 inch, 1 inch, 2 inches, 3 inches, or 4 or more inches depending on the size of the fish 112. Thus, "closed" should be construed broadly and may include embodiments where there is a space between the sidewall 120 and the conveyor device 128 at the outlet 108 of the cutting subsystem 102.

Once the fish 112 with the improperly removed portion traverses the outer face of the sidewall 120 and is collected for further processing, the detection sensor 118 (FIG. 5A) returns to its normal operating position, which triggers the controller 156 (FIG. 2) to send instructions, signals, and/or data to the actuator 122 to retract the rod 170 into the housing 172 and return the trough 104 to the open position shown in FIG. 4A and FIG. 4B. Such movement of the sidewall 120 and operation of the actuator 122 occurs simultaneously with continuous operation of the system 100 and cutting subsystem 102. In other words, the detection sensor 118 is triggered to activate the actuator 122 in response to a single fish 112 that improperly retains the head or some portion, with the next successive fish 112 that is properly cut not triggering the sensor 118 and the actuator 122 returning the trough 104 to the open position. As a result, the system 100 enables selective removal and collection of improperly processed fish 112 without downtime or otherwise negatively impacting continuous operation of the system 100.

Figure 6B:
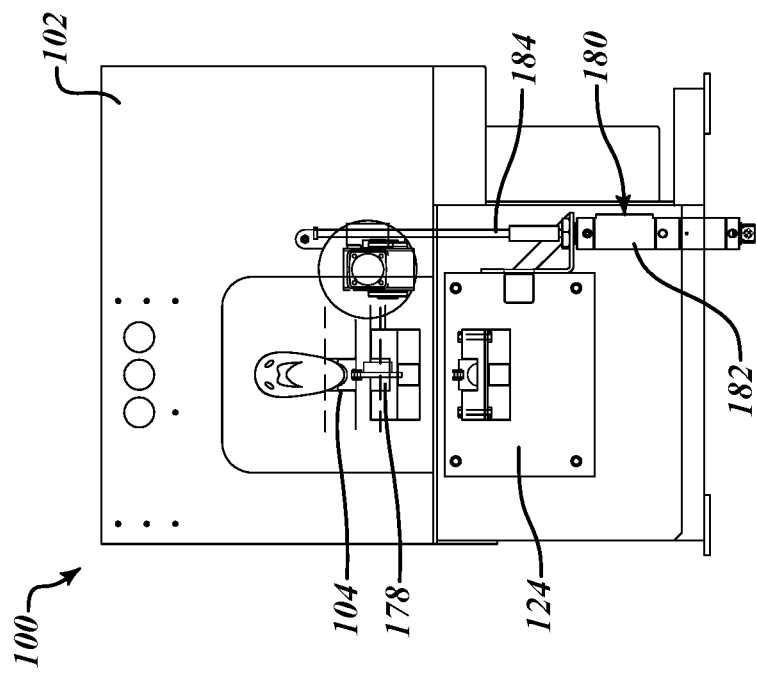
FIG. 6B is a front elevational view of the trough of FIG. 6A at an entry to the gutting subsystem.
Figure 6C:
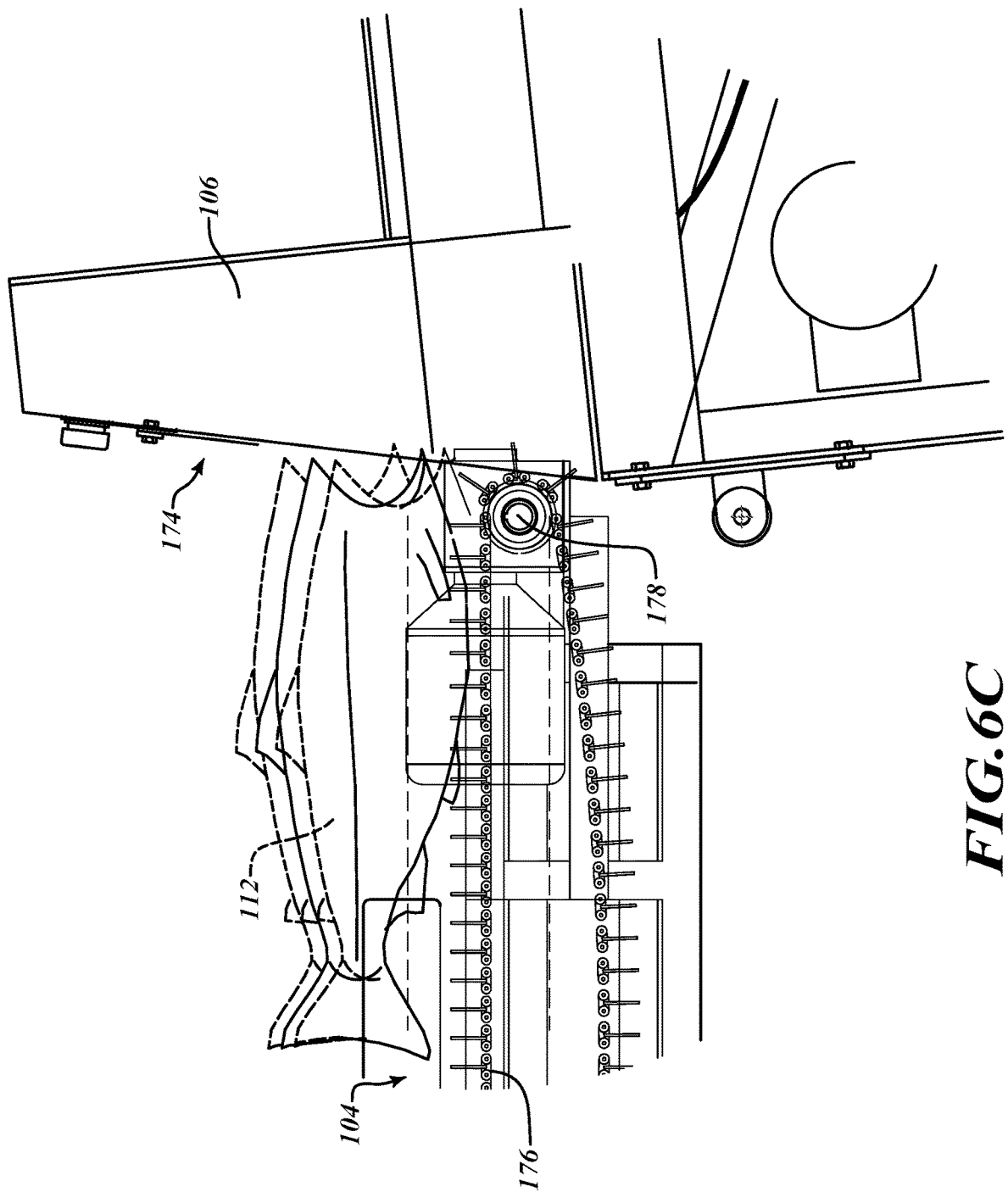
FIG. 6C is a detail view of the adjustable portion of the trough of FIG. 6A.

FIG. 6A is a side elevational view of the trough 104 and the gutting subsystem 106. FIG. 6B is a front elevational view of the trough 104 at an entry to the gutting subsystem 106. FIG. 6C is a schematic detail view of an adjustable portion of the trough 104.

Beginning with FIG. 6A, and with reference back to FIG. 1A, the trough 104 may define a path of travel from the outlet 108 of the cutting subsystem 102 to an entry or inlet 174 of the gutting subsystem 106 where the path of travel is curved, straight, angled, or any combination thereof. Further, the trough 104 may be provided in the form factor of a channel with a bottom wall and opposing sidewalls coupled to the bottom wall. The channel is open at the top to receive the fish 112, as best shown in FIG. 4B. In an embodiment, the bottom wall of the trough 104 may be a further conveyor device 176. The fish 112 with the head or other portion removed are conveyed along the trough 104 by the further conveyor device 176.

In an embodiment, the trough 104 is not directly coupled to the gutting subsystem 106 proximate the inlet 174 of the gutting subsystem 106. Rather, the end of the trough 104 is freestanding with respect to the gutting subsystem 106 and otherwise supported by the structural frame 124 associated with the trough 104. An end 178 of the trough 104 proximate the inlet 174 of the gutting subsystem 106 may be supported with respect to the structural frame 124 by an adjustment cylinder 180. As will be described in further detail below, the adjustment cylinder 180 is structured to adjust a height of at least a portion of the trough 104 proximate the end 178 to change a position of the trough 104 and the fish 112 relative to the inlet 174 of the gutting subsystem 106. In a further embodiment, the adjustment cylinder 180 interfaces with a plate or other structure under the fish 112 at the bottom of the trough 104 to change a position of the fish 112. In yet a further embodiment, the trough 104 is static and fixed in place, and the adjustment cylinder 180 is coupled to the gutting subsystem 106 and configured to adjust a position (i.e., height) of the gutting subsystem 106 relative to the trough 104.

Turning to FIG. 6B, the adjustment cylinder 180 may be a linear actuator of the type described herein with a cylinder 182 for slidably receiving an adjustment rod 184. The cylinder 182 is coupled to the structural frame 124 supporting the trough 104 and the adjustment rod 184 is coupled to the end 178 of the trough 104. In operation, the adjustment rod 184 is extended from, or retracted into, the cylinder 182 based on operation of hydraulics, an electric motor, or other drive mechanism in the cylinder 182. The movement of the adjustment rod 184 changes a position of the end 178 of the trough 104 relative to the gutting subsystem 106, as well as a position of the fish 112 relative to the inlet 174 of the gutting subsystem 106. In an embodiment, the adjustment cylinder 180 is in communication with the controller 156 (FIG. 2) and changes a position of the trough 104 based on the determined size of the fish 112 in order to align the fish 112 with the inlet 174 of the gutting subsystem 106 based on the size of the fish 112 and reduce the likelihood of jamming and other improper operation of the gutting subsystem 106.

FIG. 6C is a schematic detail view showing a change in position or height of the fish 112 relative to the inlet 174 of the gutting subsystem 106. The trough 104 may have a movable or adjustable portion corresponding to an area proximate the end 178 of the trough 104. As noted above, the adjustable portion of the trough 104 may be freestanding with respect to the gutting subsystem 106, with the adjustment cylinder 180 changing a position of the adjustable portion of the trough 104, and thus a position of the fish 112 in the trough 104, relative to the inlet 174 of the gutting subsystem 106. Such change in position is represented in FIG. 6C with dashed outlines of the fish 112. For example, fish 112 with different dimensions 158 (FIG. 3B) may benefit from being moved upward and/or downward relative to the inlet 174 of the gutting subsystem 106 to improve processing accuracy and efficiency, and reduce the likelihood of jamming. Such movement of the trough 104 and the fish 112 therefore increases processing accuracy and efficiency, with proper alignment of the fish 112 relative to the gutting subsystem 106 reducing the likelihood of jamming from inaccurate feeding of the fish 112 into the gutting subsystem 106.

Figure 7:
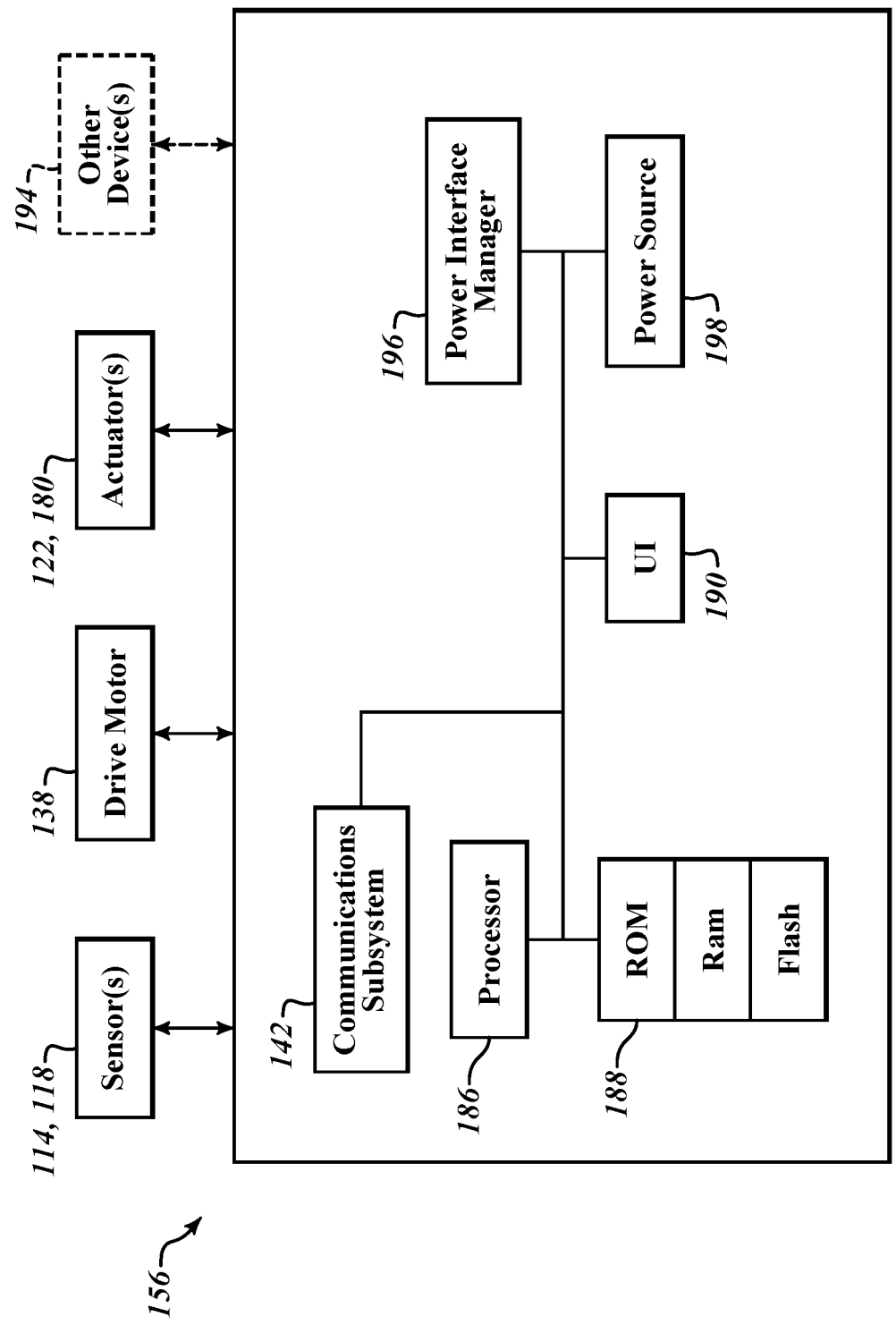
FIG. 7 is a block diagram of a controller suitable for executing an embodiment of a fish processing system that performs at least some techniques described in the present disclosure, as well as various devices and/or computing systems connected thereto.

FIG. 7 shows the controller 156 represented in black diagram or schematic form. As further described below, the controller 156 may be suitable for executing or otherwise performing at least some embodiments or techniques described herein with respect to the fish processing system 100. The physical or hardware aspects of the controller 156 may be located internal to a housing coupled to the structural frame 124 (FIG. 2), or may be located external to the fish processing system 100 and in communication with certain aspects of the system 100. For example, and with reference to FIG. 1A-6C, the controller 156 may be in communication, either wired or wirelessly according to the any of the communication protocols described herein, with at least the first sensor 114 (measurement sensor), the second sensor 118 (detection sensor), the trough 104, the drive motor 138 for the blade 146, the conveyor devices 128, 176 and drive mechanisms associated therewith, the actuator 122, the adjustment cylinder 180, and other aspects of the system 100 and/or other external devices.

The controller 156 includes a processor 186, for example a microprocessor, digital signal processor, programmable gate array (PGA) or application specific integrated circuit (ASIC). The controller 156 includes one or more non-transitory storage mediums 188, for example read only memory (ROM), random access memory (RAM), Flash memory, or other physical computer- or processor-readable storage media in communication with the processor 186. The non-transitory storage mediums 188 may store instructions and/or data used by the processor 186 and the controller 156 generally, for example an operating system (OS) and/or applications. The instructions as executed by the processor 186 may execute logic to perform the functionality of the various implementations or techniques of the devices and systems described herein, including, but not limited to, receiving signals from the one or more sensors 114, 118, and determining, based on the signals, a size of the fish 112, when to activate the drive motor 138 to perform a cutting operation based on the determined size of the fish 112, whether to instruct the actuator 122 to move the sidewall 120, and whether to instruct the adjustment cylinder 180 to adjust the trough 104, among others.

The controller 156 may include, or be in communication with, the one or more sensors, such as at least the first or measurement sensor 114 and the second or detection sensor 118. As described herein, the sensors 114, 118 send signals, instructions, and/or data to the processor 156 based on detected conditions, such as a size of the fish 112 in the field of view of the measurement sensor 114 and whether a head or other portion remains on the fish 112 and activates the detection sensor 118. In some embodiments, the controller 156 may include, or be in communication with, a status indicator or other such devices. The status indicator may be one or more LEDs or some other lighting element, a speaker, and/or a buzzer, among others. In at least some embodiments, each individual lighting element may be position- and hue-addressable, such as to control the color and state of each element independently of or in conjunction with the other lighting elements. The speaker may be a buzzer configured to emit sound as well as haptic signals or vibrations. In some embodiments, the controller 156 may include a separate speaker for emitting sound and a haptic device for emitting vibration, such as to change the strength, volume, or other characteristics of either of these signals relative to a buzzer. The status indicator may be operable, in some embodiments, to provide a signal to an operator or other user of the rejection of a fish 112, or some other characteristic of the system 100.

The controller 156 may also include a user interface (UI) 190 to allow a user to operate or otherwise provide input to the controller 156 and/or the system 100 described herein, such as with respect to the processing speed of the system 100, activation or deactivation of selected subsystems, or others. In some embodiments, the user interface 190 is configured to display information to the user, such as an operator or other user of the system regarding the operational state or other characteristics of the system 100.

Additionally, the user interface 190 may include a number of user actuatable controls, such as, for example, a number of switches or keys operable to turn certain aspects ON and OFF and/or to set various operating parameters of the system 100, the one or more sensors 114, 118, the status indicator, the drive motor 138, the actuators 122, 180, operation and control of test and/or maintenance modes, among others. The switches and keys or the user interface 190 may include, for example, toggle switches, a keypad or keyboard, rocker switches or other physical actuators.

In some embodiments, the user interface 190 may include a display, for instance a touch panel display. The touch panel display (e.g., LCD or LED with touch sensitive overlay) may provide both an input and an output interface for the user. The touch panel display may present a graphical user interface, with various user selectable icons, menus, check boxes, dialog boxes, and other components and elements selectable by the end user to set operational states or conditions of the system 100. The user interface 190 may also include one or more auditory transducers, for example one or more speakers and/or microphones. Such may allow audible alert notifications or signals to be provided to the user as a result of manual interaction with the user interface 190. Such may additionally, or alternatively, allow the user to provide audible commands or instructions. The user interface 190 may include additional components and/or different components than those illustrated or described, and/or may omit some components.

The controller 156 includes a communications sub-system 192 that may include one or more communications modules or components which facilitate communications with the aspects of the system 100 described above, as well as with one or more other devices 194, such as a personal computing device, mobile device, server, or a remote computing system associated with the controller 156 that monitors the operational characteristics of the system 100. The communications sub-system 192 may provide wireless or wired communications to one or more such devices and may include wireless receivers, wireless transmitters and/or wireless transceivers to provide wireless signal paths to the various aspects, remote components, and/or systems of the one or more paired devices. The communications sub-system 192 may, for example, include components enabling short range (e.g., via Bluetooth®, BLE ("Bluetooth® low energy"), near field communication (NFC), or radio frequency identification (RFID) components and protocols) or longer range wireless communications (e.g., over a wireless LAN, Low-Power-Wide-Area Network (LPWAN), satellite, or cellular network) and may include one or more modems or one or more Ethernet or other types of communications cards or components for doing so. The communications sub-system 192 may also include one or more bridges or routers suitable to handle network traffic including switched packet type communications protocols (TCP/IP), Ethernet or other networking protocols.

The controller 156 further includes a power interface manager 196 that manages supply of power from a power source 198 to the various components of the controller 156 and/or aspects of the system 100 described above. The power interface manager 196 is coupled to the processor 186 and the power source 198. Alternatively, in some implementations, the power interface manager 196 can be integrated in the processor 186. The power source 198 may include an external power supply, or a rechargeable or replaceable battery power supply, among others. The power interface manager 196 may include power converters, rectifiers, buses, gates, circuitry, etc. in some embodiments. In particular, the power interface manager 196 can control, limit, and/or restrict the supply of power from the power source 198 based on the various operational states of the system 100 and/or aspects of the system 100.

In some embodiments or implementations, the instructions and/or data stored on the non-transitory storage mediums 188 that may be used by the processor 186 and the controller 156 generally, such as, for example, ROM, RAM and/or Flash memory, includes or provides an application program interface ("API") that provides programmatic access to one or more functions of the controller 322. For example, such an API may provide a programmatic interface to control one or more operational characteristics of the system 100. Such control may be invoked by one of the other programs, other remote device or system, or some other module. In this manner, the API may facilitate the development of third-party software, such as various different user interfaces and control systems for other devices, plug-ins, and adapters, and the like to facilitate interactivity and customization of the operation and devices within the system 100.

In an embodiment, components or modules of the controller 156 and other devices within the systems described herein are implemented using standard programming techniques. For example, the logic to perform the functionality of the various embodiments or techniques described herein may be implemented as a "native" executable running on the controller 156, e.g., microprocessor 186, along with one or more static or dynamic libraries. In other embodiments, various functions of the controller 156 may be implemented as instructions processed by a virtual machine that executes as one or more programs whose instructions are stored on non-transitory storage mediums 188. In general, a range of programming languages known in the art may be employed for implementing such example embodiments, including representative implementations of various programming language paradigms, including but not limited to, object-oriented (e.g., Java, C++, C #, Visual Basic.NET. Smalltalk, and the like), functional (e.g., ML, Lisp, Scheme, and the like), procedural (e.g., C. Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the controller 156, such as microprocessor 186, to perform the functions of the controller 156. The instructions cause the microprocessor 186 or some other processor, such as an I/O controller/processor, to process and act on information received from the one or more sensors 114, 118, drive motor 138, actuators 122, 180, other devices 194, and other aspects of the system 100 to provide the functionality and techniques described herein.

The embodiments or implementations described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc.), running on one or more computer systems each having one or more central processing units (CPUs) or other processors. Some embodiments may execute concurrently and asynchronously, and communicate using message passing techniques.

In addition, programming interfaces to the data stored on and functionality provided by the controller 156, can be available by standard mechanisms such as through C, C++, C #, and Java APIs; libraries for accessing files, databases, or other data repositories; scripting languages; or Web servers, FTP servers, or other types of servers providing access to stored data. The data stored and utilized by the controller 156 and overall system 100 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules within the controller 156 and/or system 100 in different ways, yet still achieve the functions of the controller 156.

Furthermore, in some embodiments or implementations, some or all of the components of the controller 156 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

In at least some embodiments, the non-transitory storage medium 188 stores instructions, that when executed the processor 186, cause the controller 156 to determine the dimension 158 across the fish 112, such as across the head of the fish 112, based on instructions, signals, and/or other data from the measurement sensor 114, as described herein. The non-transitory storage medium 188 may store further instructions that are executed by the processor 186 to determine, based on instructions, signals, and/or data from the detection sensor 118, whether to activate the actuator 122 to move the movable sidewall 120 of the trough 104. The non-transitory storage medium 188 may also store instructions that are executed by the processor 186 to intermittently activate the drive motor 138 to perform a cutting operation with the blade 146 based on, or in accordance with, the dimension 158 across the fish 112. In other words, the controller 156 is operable to instruct the drive motor 138 and other aspects of the system 100 to activate the blade 146 at irregular intervals based on the detected size of the fish 112 with the measurement sensor 114.

In yet further embodiments, the non-transitory storage medium 188 stores instructions that are executed by the processor 186 to activate or deactivate conveyor devices 128, 176 and/or adjust a speed of the conveyor devices 128, 176. The non-transitory storage medium 188 may also store instructions for adjusting or otherwise manipulating the adjustment cylinder 180 to change a position of the trough 104 relative to the gutting subsystem 106. Other operational aspects of the system 100 may be similarly executed or performed by the controller 156, such as at least activation or deactivation of the entire system 100, select subsystems or other aspects of the system 100, as well as operational characteristics of various components.

The present disclosure also contemplates the techniques and other aspects above implemented as one or more methods for processing fish or other products. For example, and without limitation, a method may include transporting fish 112 through a measurement location corresponding to the measurement sensor 114 and the cutting location 116 with the conveyor device 128. The method further includes measuring the dimension or distance 158 across the fish 112 with the measurement sensor 114 at the measurement location. The method may conclude with severing a portion of the fish 112 at the cutting location 116 with the blade 146 in accordance with the measured dimension or distance 158. The blade 146 is driven by a drive mechanism, such as at least the drive device 144 described with reference to FIG. 2, with the drive mechanism in communication with the measurement sensor 114. The blade 146 is moved or otherwise operated in irregular intervals corresponding to the measured distance via the drive mechanism.

The method may further include transporting the fish 112 through the detection location 166 with the conveyor device 128 and determining with the detection sensor 118 at the detection location 166 whether the portion of the fish 112, such as the head, was successfully severed at the cutting location 116. The method may also include manipulating the movable sidewall 120 of the trough 104 with the trough 104 including the conveyor device 176. The trough 104 and/or conveyor device 176 is in communication with the conveyor device 178 with the sidewall 120 being manipulated to a closed position in response to the detection sensor 118 determining the portion of the fish 112 was not severed from the fish 112 at the cutting location 116. Similarly, the method may include manipulating the sidewall 120 to the open position to receive the fish 112 in the trough 104 in response to the detection sensor 118 and/or controller 156 determining the portion of the fish 112 was successfully severed at the cutting location 116.

In an embodiment, the method includes transporting the fish 112 along the conveyor device 176 associated with the trough 104, and aligning the fish 112 with the gutting subsystem 106. The gutting subsystem 106 is in communication with the conveyor device 176 and the method includes adjusting a vertical position of the fish 112 relative to the gutting subsystem 106 with the adjustment cylinder 180. Additional methods and processes are described and contemplated herein.

In view of the above, an embodiment of a fish processing system includes: a structural frame; a first conveyor device coupled to the structural frame configured to convey a fish received on the first conveyor device along a transport path including a measurement location and a cutting location; a measurement sensor coupled to the structural frame configured to measure a distance across a head of the fish conveyed by the first conveyor device at the measurement location; a blade movably coupled to the structural frame configured to move across the transport path of the fish conveyed by the first conveyor device at the cutting location; and a drive mechanism coupled to the structural frame and mechanically coupled to the blade, the drive mechanism in communication with the measurement sensor and configured to move the blade between a standby position and a cutting position in irregular intervals in accordance with the measured distance across the head of the fish to sever a portion from the fish conveyed across the cutting location based on the measured distance.

In an embodiment, the first conveyor device is configured to convey the fish across a detection location on the transport path, and the fish processing system further includes a detection sensor coupled to the structural frame configured to detect at the detection location whether the portion from the fish was successfully severed at the cutting location.

In an embodiment, the fish processing system further includes a second conveyor device in communication with an outlet of the first conveyor device, the second conveyor device including: a trough having a movable sidewall; and an actuator mechanically coupled to the movable sidewall and in communication with the detection sensor, the actuator configured to move the movable sidewall between an open position in which the fish is received in the trough in response to the detection sensor determining the portion from the fish was successfully severed at the cutting location, and a closed position in which the movable sidewall closes the trough to prevent the fish from entering the trough in response to the detection sensor determining the portion from the fish was not successfully severed at the cutting location.

In an embodiment, the fish processing system further includes: a second conveyor device in communication with an outlet of the first conveyor device; and a fish processing subsystem in communication with an outlet of the second conveyor device, and wherein the second conveyor device includes an adjustment cylinder proximate the outlet of the second conveyor device which is configured to change a position of the fish relative to the fish processing subsystem for alignment of the fish with an inlet of the fish processing subsystem.

In an embodiment, the adjustment cylinder is configured to change a vertical position of the fish relative to the fish processing subsystem.

In an embodiment, the measurement sensor is positioned vertically above the fish on the first conveyor device to measure a horizontal distance across the fish from a jaw of the fish to a back of the head of the fish.

In an embodiment, the drive mechanism is configured to move the blade between the standby position and the cutting position to sever the portion from the fish at a location on the fish that corresponds to approximately 30% of the measured distance across the fish.

In an embodiment, a fish processing system includes: a first conveyor device configured to convey a fish along a transport path; a measurement sensor coupled to the conveyor device configured to measure a distance across the fish; a blade movable across the transport path; and a drive mechanism mechanically coupled to the blade and in communication with the measurement sensor, the drive mechanism configured to move the blade across the transport path in irregular intervals in accordance with the measured distance across the fish.

In an embodiment, the first processing subsystem further including a detection sensor coupled to the first conveyor device configured to detect whether a portion of the fish was successfully severed by the blade.

In an embodiment, the fish processing system further includes a second conveyor device in communication with the first processing subsystem, the second conveyor device including a trough with a sidewall movable between an open position and a closed position to selectively provide access to the trough.

In an embodiment, the second conveyor device further includes an actuator coupled to the sidewall of the trough and in communication with the movement sensor, the actuator configured to move the sidewall from the open position to the closed position in response to the detection sensor contacting the portion of the fish.

In an embodiment, the second conveyor device further includes an adjustment cylinder, the fish processing system further including a second processing subsystem in communication with the second conveyor device, the adjustment cylinder configured to change a position of the fish relative to the second processing subsystem.

In an embodiment, the fish processing system further includes: a second conveyor device in communication with the first processing subsystem, the second conveyor device including an adjustment cylinder; and a second processing subsystem in communication with the second conveyor device, and wherein the adjustment cylinder is configured to change a position of the fish relative to the second processing subsystem.

In an embodiment, a method of processing fish includes: transporting fish through a measurement location and a cutting location with a first conveyor device; measuring a distance across the fish with a measurement sensor at the measurement location; and severing a portion of the fish at the cutting location with a blade driven by a drive mechanism in communication with the measurement sensor, including moving the blade in irregular intervals in accordance with the measured distance with the drive mechanism.

In an embodiment, the method further includes: transporting fish through a detection location with the first conveyor device; and determining with a detection sensor at the detection location whether the portion of the fish was successfully severed at the cutting location.

In an embodiment, the method further includes manipulating a movable sidewall of a trough of a second conveyor device in communication with the first conveyor device to a closed position in response to the detection sensor determining the portion of the fish was not severed from the fish at the cutting location.

In an embodiment, the method further includes manipulating a movable sidewall of a trough of a second conveyor device in communication with the first conveyor device to an open position to receive the fish in the trough in response to the detection sensor determining the portion of the fish was successfully severed from the fish at the cutting location.

In an embodiment, the method further includes: transporting the fish along the second conveyor device; and aligning the fish with a processing subsystem in communication with the second conveyor device, including adjusting a position of the fish relative to the processing system with an adjustment cylinder of the second conveyor device.

In an embodiment, the method further includes: transporting the fish along a second conveyor device in communication with the first conveyor device; and aligning the fish with a processing subsystem in communication with the second conveyor device, including adjusting a position of the fish relative to the processing system with an adjustment cylinder of the second conveyor device.

In an embodiment, a fish processing system includes: a structural frame; a conveyor device coupled to the structural frame configured to convey a fish received on the conveyor device along a transport path including a cutting location and a detection location; a blade movably coupled to the structural frame configured to move across the transport path of the fish conveyed by the conveyor device at the cutting location; a drive mechanism coupled to the structural frame and mechanically coupled to the blade, the drive mechanism configured to move the blade between a standby position and a cutting position to sever a portion from the fish conveyed across the cutting location; and a detection sensor coupled to the structural frame configured to detect at the detection location whether the portion from the fish was successfully severed at the cutting location.

In an embodiment, a fish processing system includes: a first processing subsystem configured to sever a first portion of a fish; a second processing subsystem configured to remove a second portion of the fish; and a conveyor device in communication with the first processing subsystem and the second processing subsystem, including a trough proximate an outlet of the first processing subsystem having a sidewall movable between an open position and a closed position to selectively provide access to the trough, and an actuator coupled to the sidewall of the trough configured to move the sidewall from the open position to the closed position.

In an embodiment, the conveyor device further includes an adjustment cylinder proximate an inlet of the second processing subsystem, the adjustment cylinder configured to change a position of the fish relative to the second processing subsystem.

In the foregoing description, certain specific details are set forth in order to provide a thorough understanding of various disclosed embodiments. However, one skilled in the relevant art will recognize that embodiments may be practiced without one or more of these specific details. In other instances, well-known structures and techniques associated with the technology may not be shown or described in detail to avoid unnecessarily obscuring descriptions of the embodiments. For instance, well known power transmission components may be provided, but are not shown and described in detail herein, to transmit power to and drive elements of the various fish processing systems described herein. Drive and control systems may also be provided to selectively control a speed with which components move and thus a rate at which fish are processed.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Moreover, aspects and features of the various embodiments described above may be combined to provide further embodiments, and may be combined with other features of known fish processing machines and methods, such as, for example, those shown and described in U.S. Pat. Nos. 3,309,730; 5,520,576; 6,994,617; 8,512,106; 8,834,238; 8,986,077; 9,635,867 and 9,839,223. All of the above US patents are incorporated herein by reference, in their entirety. Aspects of the embodiments can be modified, if necessary, to employ systems, concepts and features of the various patents to provide yet further embodiments.

Furthermore, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fish processing system, comprising:
   a structural frame;
   a first conveyor device coupled to the structural frame configured to convey a fish received on the first conveyor device along a transport path including a measurement location and a cutting location;
   a measurement sensor coupled to the structural frame configured to measure a distance across a head of the fish conveyed by the first conveyor device at the measurement location;
   a blade movably coupled to the structural frame configured to move across the transport path of the fish conveyed by the first conveyor device at the cutting location; and
   a drive mechanism coupled to the structural frame and mechanically coupled to the blade, the drive mechanism in communication with the measurement sensor and configured to move the blade between a standby position and a cutting position in irregular intervals in accordance with the measured distance across the head of the fish to sever a portion from the fish conveyed across the cutting location based on the measured distance.

2. The fish processing system of claim 1, wherein the first conveyor device is configured to convey the fish across a detection location on the transport path, the fish processing system further comprising:
   a detection sensor coupled to the structural frame configured to detect at the detection location whether the portion from the fish was successfully severed at the cutting location.

3. The fish processing system of claim 2, further comprising:
   a second conveyor device in communication with an outlet of the first conveyor device, the second conveyor device including:
      a trough having a movable sidewall;
      an actuator mechanically coupled to the movable sidewall and in communication with the detection sensor, the actuator configured to move the movable sidewall between an open position in which the fish is received in the trough in response to the detection sensor determining the portion from the fish was successfully severed at the cutting location, and a closed position in which the movable sidewall closes the trough to prevent the fish from entering the trough in response to the detection sensor determining the portion from the fish was not successfully severed at the cutting location.

4. The fish processing system of claim 1, further comprising:
a second conveyor device in communication with an outlet of the first conveyor device; and
a fish processing subsystem in communication with an outlet of the second conveyor device, and
wherein the second conveyor device includes an adjustment cylinder proximate the outlet of the second conveyor device which is configured to change a position of the fish relative to the fish processing subsystem for alignment of the fish with an inlet of the fish processing subsystem.

5. The fish processing system of claim 4, wherein the adjustment cylinder is configured to change a vertical position of the fish relative to the fish processing subsystem.

6. The fish processing system of claim 1, the measurement sensor is positioned vertically above the fish on the first conveyor device to measure a horizontal distance across the fish from a jaw of the fish to a back of the head of the fish.

7. The fish processing system of claim 1, wherein the drive mechanism is configured to move the blade between the standby position and the cutting position to sever the portion from the fish at a location on the fish that corresponds to approximately 30% of the measured distance across the fish.

8. A fish processing system, comprising:
a first processing subsystem, including:
a first conveyor device configured to convey a fish along a transport path;
a measurement sensor coupled to the conveyor device configured to measure a distance across the fish;
a blade movable across the transport path; and
a drive mechanism mechanically coupled to the blade and in communication with the measurement sensor, the drive mechanism configured to move the blade across the transport path in irregular intervals in accordance with the measured distance across the fish.

9. The fish processing system of claim 8, wherein the first processing subsystem further includes:
a detection sensor coupled to the first conveyor device configured to detect whether a portion of the fish was successfully severed by the blade.

10. The fish processing system of claim 9, further comprising:
a second conveyor device in communication with the first processing subsystem, the second conveyor device including:
a trough with a sidewall movable between an open position and a closed position to selectively provide access to the trough.

11. The fish processing system of claim 10, wherein the second conveyor device further includes:
an actuator coupled to the sidewall of the trough and in communication with the movement sensor, the actuator configured to move the sidewall from the open position to the closed position in response to the detection sensor contacting the portion of the fish.

12. The fish processing system of claim 11, wherein the second conveyor device further includes an adjustment cylinder, the fish processing system further comprising:
a second processing subsystem in communication with the second conveyor device, the adjustment cylinder configured to change a position of the fish relative to the second processing subsystem.

13. The fish processing system of claim 8, further comprising:
a second conveyor device in communication with the first processing subsystem, the second conveyor device including an adjustment cylinder; and
a second processing subsystem in communication with the second conveyor device, and
wherein the adjustment cylinder is configured to change a position of the fish relative to the second processing subsystem.

14. A method of processing fish, comprising:
transporting fish through a measurement location and a cutting location with a first conveyor device;
measuring a distance across the fish with a measurement sensor at the measurement location; and
severing a portion of the fish at the cutting location with a blade driven by a drive mechanism in communication with the measurement sensor, including moving the blade in irregular intervals in accordance with the measured distance with the drive mechanism.

15. The method of claim 14, further comprising:
transporting fish through a detection location with the first conveyor device; and
determining with a detection sensor at the detection location whether the portion of the fish was successfully severed at the cutting location.

16. The method of claim 15, further comprising:
manipulating a movable sidewall of a trough of a second conveyor device in communication with the first conveyor device to a closed position in response to the detection sensor determining the portion of the fish was not severed from the fish at the cutting location.

17. The method of claim 15, further comprising:
manipulating a movable sidewall of a trough of a second conveyor device in communication with the first conveyor device to an open position to receive the fish in the trough in response to the detection sensor determining the portion of the fish was successfully severed from the fish at the cutting location.

18. The method of claim 17, further comprising:
transporting the fish along the second conveyor device; and
aligning the fish with a processing subsystem in communication with the second conveyor device, including adjusting a position of the fish relative to the processing system with an adjustment cylinder of the second conveyor device.

19. The method of claim 14, further comprising:
transporting the fish along a second conveyor device in communication with the first conveyor device; and
aligning the fish with a processing subsystem in communication with the second conveyor device, including adjusting a position of the fish relative to the processing system with an adjustment cylinder of the second conveyor device.

20. A fish processing system, comprising:
a structural frame;
a conveyor device coupled to the structural frame configured to convey a fish received on the conveyor device along a transport path including a cutting location and a detection location;

a blade movably coupled to the structural frame configured to move across the transport path of the fish conveyed by the conveyor device at the cutting location;

a drive mechanism coupled to the structural frame and mechanically coupled to the blade, the drive mechanism configured to move the blade between a standby position and a cutting position to sever a portion from the fish conveyed across the cutting location; and a detection sensor coupled to the structural frame configured to detect at the detection location whether the portion from the fish was successfully severed at the cutting location.

21. A fish processing system, comprising:

a first processing subsystem configured to sever a first portion of a fish;

a second processing subsystem configured to remove a second portion of the fish; and a conveyor device in communication with the first processing subsystem and the second processing subsystem, including:

a trough proximate an outlet of the first processing subsystem having a sidewall movable between an open position and a closed position to selectively provide access to the trough; and an actuator coupled to the sidewall of the trough configured to move the sidewall from the open position to the closed position.

22. The fish processing system of claim 21, wherein the conveyor device further includes:

an adjustment cylinder proximate an inlet of the second processing subsystem, the adjustment cylinder configured to change a position of the fish relative to the second processing subsystem.

* * * * *